United States Patent
Ahlgren et al.

(10) Patent No.: US 6,514,583 B1
(45) Date of Patent: *Feb. 4, 2003

(54) HIGH IMPACT STRENGTH FILM CONTAINING SINGLE SITE CATALYZED COPOLYMER

(75) Inventors: Kelly R. Ahlgren, Greenville, SC (US); Robert Babrowicz, Spartanburg, SC (US); Solomon Bekele, Taylors, SC (US); Blaine C. Childress, Inman, SC (US); Marvin R. Havens, Greer, SC (US); Vincent W. Herran, Greenville, SC (US); Ronald D. Moffitt, Duncan, SC (US); Gautam P. Shah, Simpsonville, SC (US); George D. Wofford, Duncan, SC (US)

(73) Assignee: Cryovac, Inc., Duncan, SC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/932,946

(22) Filed: Sep. 17, 1997

(65) Prior Publication Data (65)

Related U.S. Application Data

(63) Continuation of application No. 08/481,782, filed on Jun. 7, 1995, now abandoned, which is a continuation-in-part of application No. 08/418,926, filed on Apr. 7, 1995, now abandoned, which is a continuation of application No. 07/976,122, filed on Nov. 13, 1992, now abandoned.

(51) Int. Cl.[7] .................... B32B 27/32; C08F 10/02

(52) U.S. Cl. .................... 428/34.9; 428/35.2; 428/35.4; 428/332; 428/337; 428/500; 428/515; 428/520; 428/516; 525/74; 525/240; 525/221; 525/222; 526/348.1

(58) Field of Search .................. 428/34.1, 34.9, 428/35.2, 36.6, 36.7, 36.9, 36.91, 36.92, 347, 515, 516, 518, 520, 35.4, 332, 337; 526/348.1, 348.5; 525/240, 285, 221, 222, 74

(56) References Cited

U.S. PATENT DOCUMENTS

| | | | |
|---|---|---|---|
| 3,161,629 A | 12/1964 | Gorsich | 260/94.9 |
| 3,456,044 A | * 7/1969 | Pahlke | 264/567 |
| 4,302,565 A | 11/1981 | Goeke et al. | 526/88 |
| 4,302,566 A | 11/1981 | Karol et al. | 526/125 |

(List continued on next page.)

FOREIGN PATENT DOCUMENTS

| | | | |
|---|---|---|---|
| AU | 676047 | * | 2/1997 |
| EP | 227 421 | | 12/1986 |

(List continued on next page.)

OTHER PUBLICATIONS

Film Containing Exact 4011 Sold Jun. 25, 1993.

(List continued on next page.)

Primary Examiner—D. Lawrence Tarazano
(74) Attorney, Agent, or Firm—Rupert B. Hurley, Jr.

(57) ABSTRACT

A heat-shrinkable film containing a homogeneous ethylene/alpha-olefin copolymer has a high impact strength and a high free shrink. The film can be a monolayer film or multilayer film, with the homogeneous ethylene/alpha-olefin copolymer present alone or in a blend, and in one or more film layers. The film is especially suited for use in heat-shrinkable bags, which can be used for the packaging of various products, especially meat.

51 Claims, 4 Drawing Sheets

U.S. PATENT DOCUMENTS

| | | | |
|---|---|---|---|
| 4,306,041 A | 12/1981 | Cozewith et al. | 526/65 |
| 4,424,243 A | 1/1984 | Nishimoto et al. | 428/36 |
| 4,429,079 A | 1/1984 | Shibata et al. | 525/240 |
| 4,456,646 A | 6/1984 | Nishimoto et al. | 428/216 |
| 4,457,960 A | 7/1984 | Newsome | 428/35 |
| 4,469,753 A | 9/1984 | Yoshimura et al. | 428/475.8 |
| 4,501,634 A | 2/1985 | Yoshimura et al. | 156/244.24 |
| 4,532,189 A | 7/1985 | Mueller | 428/516 |
| 4,540,753 A | 9/1985 | Cozewith et al. | 526/88 |
| 4,551,380 A | 11/1985 | Schoenberg | 428/218 |
| 4,640,856 A | 2/1987 | Ferguson et al. | 428/36 |
| 4,701,432 A | 10/1987 | Welborn, Jr. | 502/113 |
| 4,833,024 A | 5/1989 | Mueller | 428/349 |
| 4,837,084 A | 6/1989 | Warren | 428/349 |
| 4,863,769 A | 9/1989 | Lustig et al. | 428/34.9 |
| 4,865,902 A | 9/1989 | Golike et al. | 428/215 |
| 4,871,705 A | 10/1989 | Hoel | 502/117 |
| 4,909,881 A | 3/1990 | Garland | 156/229 |
| 4,935,397 A | 6/1990 | Chung | 502/117 |
| 4,976,898 A | 12/1990 | Lustig et al. | 264/22 |
| 5,001,016 A | 3/1991 | Kondo et al. | 428/516 |
| 5,023,143 A | 6/1991 | Nelson | 428/516 |
| 5,032,463 A | 7/1991 | Smith | 428/520 |
| 5,055,328 A | 10/1991 | Evert et al. | 428/34.9 |
| 5,055,438 A | 10/1991 | Canich | 502/117 |
| 5,057,475 A | 10/1991 | Canich et al. | 502/104 |
| 5,059,481 A | 10/1991 | Lustig et al. | 428/39.9 |
| 5,064,797 A | 11/1991 | Stricklen | 502/111 |
| 5,064,802 A | 11/1991 | Stevens et al. | 502/155 |
| 5,084,534 A | 1/1992 | Welborn, Jr. et al. | 526/160 |
| 5,088,228 A | 2/1992 | Waldie, Jr. | 43/43.12 |
| 5,132,074 A | 7/1992 | Isozaki et al. | 264/564 |
| 5,132,380 A | 7/1992 | Stevens et al. | 526/126 |
| 5,206,075 A | 4/1993 | Hodgson, Jr. | 428/216 |
| 5,241,031 A | 8/1993 | Mehta | 526/348.1 |
| 5,266,392 A | 11/1993 | Land et al. | 428/224 |
| 5,272,016 A | 12/1993 | Ralph | 428/516 |
| 5,272,236 A | 12/1993 | Lai et al. | 526/348.5 |
| 5,278,272 A | 1/1994 | Lai et al. | 526/348.5 |
| 5,279,872 A | 1/1994 | Ralph | 428/34.9 |
| 5,283,128 A | 2/1994 | Wilhoit | 428/516 |
| 5,302,402 A | 4/1994 | Dudenhoeffer et al. | 426/129 |
| 5,374,459 A | 12/1994 | Mumpower | 428/36.7 |
| 5,376,394 A | 12/1994 | Dudenhoeffer et al. | 426/415 |
| 5,376,439 A | 12/1994 | Hodgson et al. | 428/220 |
| 5,397,613 A | 3/1995 | Georgelos | 428/36.7 |
| 5,397,640 A | 3/1995 | Georgelos et al. | 428/349 |
| 5,403,668 A | 4/1995 | Wilhoit | 428/500 |
| 5,427,807 A | 6/1995 | Chum et al. | 426/393 |
| 5,472,791 A | 12/1995 | Landoni | 428/516 |
| 5,491,019 A | 2/1996 | Kuo | 428/213 |
| RE35,285 E | 6/1996 | Quacquarella et al. | 428/34.9 |
| 5,562,958 A | 10/1996 | Walton et al. | 428/34.9 |
| 5,604,043 A | 2/1997 | Ahlgren | 428/518 |
| 5,677,383 A | 10/1997 | Chum et al. | 525/240 |
| 5,834,077 A * | 11/1998 | Babrowicz | 428/34.9 |
| 5,837,335 A * | 11/1998 | Babrowicz | 428/34.9 |

FOREIGN PATENT DOCUMENTS

| | | |
|---|---|---|
| EP | 0 416 815 | 3/1991 |
| EP | 0 452 920 | 10/1991 |
| EP | 0 492 656 | 1/1992 |
| EP | 0 495 099 | 7/1992 |
| EP | 0 562 493 | 3/1993 |
| EP | 0 562 496 | 9/1993 |
| EP | 0 597 502 | 5/1994 |
| EP | 0 600 425 | 6/1994 |
| EP | 0 662 988 | 7/1995 |
| EP | 0 662 989 | 7/1995 |
| GB | 1 209 825 | 10/1970 |
| GB | 2 097 324 | 4/1982 |
| GB | 2 206 890 | 1/1989 |
| JP | 58-37907 | 4/1983 |
| JP | 102762/83 | 6/1983 |
| JP | 63-175004 | 7/1988 |
| WO | WO 87/03887 | 7/1987 |
| WO | WO 90/03414 | 4/1990 |
| WO | WO 92/14784 | 9/1992 |
| WO | PCT/US93/09173 | 1/1993 |
| WO | WO 93/03093 | 2/1993 |
| WO | WO 93/08221 | 4/1993 |
| WO | WO 93/11940 | 6/1993 |
| WO | WO 93/12151 | 6/1993 |
| WO | WO 94/06857 | 3/1994 |
| WO | WO 94/07954 | 4/1994 |
| WO | WO 94/09060 | 4/1994 |
| WO | WO 95/00333 | 1/1995 |

OTHER PUBLICATIONS

"Exact Linear Ethylene Polymers for Enhanced Sealing Performance", D. Van Der Sanden and R.W. Halle Antec '92, pp 154–158.

"A new family of linear ethylene polymers provides enhanced sealing performance", R.W. Halle and D. Van Der Sanden, Feb. 1992 Tappi Journal, pp 99–103.

"PW Technology Watch", B. Miller, Plastics World, Nov. 1991, p 29.

"Polyolefins gain higher performance from new catalyst technologies", R. Leaversuch, Modern Plastics, Oct. 1991, pp 46–49.

"Exxon Cites Breakthrough in Olefins Polymerization", Modern Plastics, Jul. 1991, pp61 & 62.

"New Polyolefin Resins Emerge: Branched Linear Copolymers", Modern Plastics International, Nov. 1992, pp 16–18.

"Enter a New Generation of Polyolefins", Plastics Technology, Nov. 1991, pp 15–17.

"Novel Rheological Behavior Claimed for New–Tech Polyolefins", Plastics Technology, Nov. 1992, pp 23 & 25.

"Dow's Patent on Elastic Substantially Linear Olefin Polymers:", The Metallocene Monitor, 1993, pp 2–6.

"Determination of Branching Distributions in Polyethylene and Ethyene Copolymers", Wild et al., Journal of Polymer Science, vol. 20, 1982, pp 441–455.

RD&E Development Order Form, Film Type LDX–3204 (Undated).

Duncan Customer Service Form, to H.E. Butt Grocery, Product #9W947 (Undated).

"Homogeneous Catalysis, Industrial Applications and Implications", American Chemical Society, 1968, R. Gould, Editor.

"A New Family of Linear Ethylene Polymers with Enhanced Sealing Performance", D. Van Der Sanden and R. W. Halle, 1991 Pollymers Laminations & Coatings Conference, pp 289–291.

"Ethylene Polymers", Encyclopedia of Polymer Scinece and Engineering, Second Edition, vol. 6, pp 420–423.

"Single–Site Metallocene Catalysts Yield Tailor–Made Polyolefin Resins", Don Schwank, Modern Plastics International, Aug. 1993, pp 40 & 41.

* cited by examiner

HIGH IMPACT STRENGTH FILM CONTAINING SINGLE SITE CATALYZED COPOLYMER

CROSS-REFERENCE TO RELATED APPLICATIONS

This application is a continuation of U.S. Ser. No. 08/481,782, filed Jun. 7, 1995 now abandoned, which is a continuation-in-part of U.S. Ser. No. 08/418,926, filed Apr. 7, 1995 now abandoned, which is a continuation of U.S. Ser. No. 07/976,122, filed Nov. 13, 1992 now abandoned.

FIELD OF THE INVENTION

The present invention is directed to films which contain single site catalyzed copolymers. The present invention is especially directed to such films suitable for use in the packaging of products, especially fresh meat products and processed meat products. The present invention is also directed to packages comprising such films, especially heat shrinkable films.

BACKGROUND OF THE INVENTION

Polyethylene-based films have found many useful applications in the packaging of meats, cheeses, and poultry, as well as other food products and non-food products. Polyethylene heat-shrinkable films have been used to obtain a tight package by placing the product in, for example, a bag made from the heat-shrinkable film, followed by sealing the bag and thereafter passing the product, in the sealed bag, through a shrink tunnel in which the bag shrinks to form a tight package around the product. Heat-shrinkable films comprising heterogeneous ethylene/alpha-olefin copolymer, such as linear low density polyethylene (LLDPE), are known to be particularly useful for making heat-shrinkable bags for packaging large cuts of fresh red meat, including bone-in meat products.

Broadly considered, for more than 10 years homogeneous ethylene/alpha-olefin copolymers have been known to those of skill in the polyethylene art. Homogeneous ethylene/alpha-olefin copolymers contain multiple polymer chains with each polymer chain having virtually the same architecture, e.g., virtually identical molecular weight and virtually identical comonomer mer distribution. Therefore, the copolymer chains produced from single site systems are uniform not only in chain length, but also in average comonomer content, and even regularity of comonomer spacing, i.e., incorporation of comonomer mer along the chain.

However, the early homogeneous polymers are the result of polymerization processes so inefficient the resulting polymers have generally had a density too low, and been too expensive, to be commercially competitive in the vast majority of commercial polyethylene packaging films. More recently, i.e., in the mid to late 1980's, novel single site catalysts were used in the production of homogeneous ethylene/alpha-olefin copolymers, these catalysts being referred to as metallocene catalysts, single site catalysts, constrained geometry catalysts, etc. Using such catalysts, the homogeneous ethylene/alpha-olefin copolymers can be produced so efficiently that the cost of the resulting homogeneous polymers is competitive with heterogeneous polyethylene copolymers which have been used for many years in the manufacture of a wide variety of packaging films.

Generally speaking, metallocene catalysts, etc. are organometallic compounds containing one or more cyclopentadienyl ligands attached to metals such as hafnium, titanium, vanadium, or zirconium. A co-catalyst, such as but not limited to, oligomeric methyl alumoxane is often used to promote the catalytic activity. By varying the metal component and the cyclopentadienyl ligand a diversity of polymer products may be tailored having molecular weights ranging from about 200 to greater than 1,000,000 and molecular weight distributions, i.e, $M_w/M_n$, of from about 1.5 to 15. The choice of co-catalyst influences the efficiency and thus the production rate, yield, and cost.

Examples of metallocene catalysts include, for example, bis(cyclopentadienyl) dichloro-transition metal, bis (cyclopentadienyl) methyl, chloro-transition metal, and bis (cyclopentadienyl) dimethyl-transition metal, where the metals include choices such as titanium, zirconium, hafnium, and vanadium. Examples of non-metallocene catalysts include $TiCl_4$, $TiBr_4$, $Ti(OC_4H_9)_2Cl_2$, $VCl_4$, and $VOCl_3$.

Moreover, metallocene catalysts, etc., have enabled the production of homogeneous ethylene/alpha-olefin copolymers over a wide range of density. That is, most of the early homogeneous ethylene/alpha-olefin copolymers have a relatively low density. However, the novel metallocene catalysts can be used to polymerize homogeneous ethylene/alpha-olefin copolymers over a much wider density range. This wider density range includes the densities of various heterogeneous ethylene/alpha-olefin copolymers previously used in commercialized packaging films, i.e, heterogeneous ethylene/alpha-olefin copolymers such as LLDPE and very low density polyethylene (VLDPE). In other words, although the early homogeneous ethylene/alpha-olefin copolymers generally have a density under 0.90 g/cc, the new metallocene catalysts, etc. can be used to provide homogeneous ethylene/alpha-olefin copolymers having densities at and above 0.90 g/cc., at a cost competitive with LLDPE and VLDPE. Accordingly, commercial interest in homogeneous polymers has increased due to the relatively low cost of the homogeneous polymers available through the use of metallocene catalysts, etc. This increased commercial interest is evident in the area of packaging films, as homogeneous polymers are now cost-effective, and are known as having a much more narrow molecular weight distribution, and a much more regular comonomer distribution, than the heterogeneous polymers which have to-date been the principal ethylene/alpha-olefin copolymers used by the plastics industry. As such, homogeneous polymers present the potential of providing properties more highly "tailored" to specific end uses.

It remains desirable to provide packaging films having improved characteristics, i.e, to provide films having improved physical properties, such as increased impact strength, greater clarity and gloss, increased free shrink and shrink at a lower temperature, improved printability, improved extrudability and processability, etc.

SUMMARY OF THE INVENTION

It has been discovered that homogeneous ethylene/alpha-elfin copolymers can be used to provide a heat-shrinkable film having a surprisingly high impact strength while also having a high total free shrink at 185° F. The surprisingly high impact strength is obtained by preparing a heat-shrinkable film comprising a homogeneous ethylene/alpha-olefin copolymer. Such heat-shrinkable films can be prepared, for example, by extruding an unoriented "tape" comprising the homogeneous ethylene/alpha-olefin copolymer, and thereafter orienting the tape at a relatively low temperature, in order to provide the film with the a relatively high free shrink. By orienting the tape at a relatively low temperature, an impact strength is achieved which is substantially higher than the impact strength obtainable upon orienting a similar film comprising a heterogeneous ethylene/alpha-olefin copolymer of comparable density prepared in a comparable process. Applicants have discovered that heat shrinkable monolayer films according to the present invention, i.e, comprising homogeneous ethylene/alpha-olefin copolymer, have surprisingly high impact strength, e.g., impact strengths of from 3 to 13 times the impact strength of comparably-produced monolayer heat-shrinkable films comprising heterogeneous ethylene/alpha-olefin copolymer of comparable density and comparable melt index.

The higher impact strength achieved by the film of the present invention can be used to provide a film having an increased impact strength for any given thickness. In turn, this advantage renders it possible to maintain an impact strength while downgauging the film thickness, thereby conserving resin while maintaining the impact strength performance.

As a first aspect, the present invention is directed to a heat-shrinkable film comprising a homogeneous ethylene/alpha-olefin copolymer, wherein the film has an impact strength of from about 35 to 200 pounds and a total free shrink, at 185° F., of from about 80 to 150 percent. Preferably, the heat-shrinkable film has an impact strength of from about 40 to 90 pounds, and preferably, has a total thickness of from about 1 to 3 mils. More preferably, the film has a total free shrink, at 185° F., of from about 80 to 120 percent, and preferably has an impact strength of from about 50 to 110 pounds. Still more preferably, the heat-shrinkable film has an impact strength of from about 60 to 110 pounds.

The heat-shrinkable film can be a monolayer film or a multilayer film. If a multilayer film, the film layer comprising the homogeneous ethylene/alpha olefin copolymer can be an inner layer or an outer layer. If in an inner layer, the homogeneous ethylene/alpha olefin copolymer can be present in the inner layer in an amount of from about 60 to 100 weight percent, based on the weight of the inner layer, with the inner layer having a thickness of from about 1 to 3 mils; more preferably, the homogeneous ethylene/alpha olefin copolymer is present in the inner layer in an amount of about 80 to 100 weight percent, based on the weight of the inner layer, with the inner layer having a thickness of about 1 to 2.5 mils; still more preferably, the homogeneous ethylene/alpha olefin copolymer is present in the inner layer in an amount of about 90 to 100 weight percent, based on the weight of the inner layer; yet still more preferably, the homogeneous ethylene/alpha olefin copolymer is present in the inner layer in an amount of about 100 weight percent, based on the weight of the inner layer, with the inner layer having a thickness of from about 1 to 2.5 mils.

The homogeneous ethylene/alpha-olefin copolymer can be present in the film layer alone or as a first component present in a composition which further comprises a second component. Preferably, the second component comprises at least one member selected from the group consisting of another ethylene/alpha-olefin copolymer, ethylene/vinyl acetate copolymer, ethylene/vinyl ester copolymer, ethylene/acrylic acid copolymer, propylene/ethylene copolymer, polyethylene homopolymer, polypropylene homopolymer, and ionomer, with the second component being present in the composition in an amount of from about 1 to 40 weight percent, based on the weight of the composition. Preferably, the first component and the second component are in a substantially uniform blend. The second component can also be any one of the above polymers which is anhydride grafted, more preferably maleic anhydride grafted. Methacrylic acid copolymer is a preferred acrylic acid copolymer for the second component. Methyl acrylate and butyl acrylate are preferred vinyl esters for the second component.

A preferred multilayer heat-shrinkable film further comprises an $O_2$-barrier layer and an outer sealant layer. More preferably, the outer sealant layer is a first outer layer, and an outer abuse layer is a second outer layer.

Another more preferred multilayer film further comprises an $O_2$-barrier layer and an outer sealant layer, and at least one tie layer between the barrier layer and the first outer layer. Still more preferably, the tie layer between the barrier layer and the first outer layer is a first tie layer, and a second tie layer is between the barrier layer and the second outer layer.

A preferred film, having the homogeneous ethylene/alpha-olefin copolymer in an outer film layer, comprises a first outer film layer comprising a first homogeneous ethylene/alpha-olefin copolymer, and a second homogeneous ethylene/alpha-olefin in a second outer film layer. More preferably, the first homogeneous ethylene/alpha-olefin copolymer is substantially identical to the second homogeneous ethylene/alpha-olefin copolymer. Still more preferably, the first and second outer layers are substantially identical in chemical composition and thickness, and the heat-shrinkable film is substantially symmetrical.

A particularly preferred multilayer film according to the present invention comprises a first inner layer, a second inner layer, and a third inner layer. The first inner layer is a first tie layer, the second inner layer is an $O_2$-barrier layer, and the third inner layer is a second tie layer. The first and second outer layers are substantially identical in chemical composition and thickness, and the first and second tie layers are substantially identical in chemical composition and thickness, and the heat-shrinkable film is substantially symmetrical.

Preferably, the heat-shrinkable film has a total free shrink, at 185° F., of at least 50 percent; more preferably, from about 55 to 200 percent; still more preferably, from about 55 to 110 percent.

Preferably, the heat-shrinkable film comprises at least one layer comprising a crosslinked polymer network. Preferably, the crosslinking is formed by irradiating the polymer.

The homogeneous ethylene/alpha-olefin copolymer preferably has a density of from about 0.86 to 0.93 g/cc; more preferably, from about 0.88 to 0.91 g/cc; and still more preferably, from about 0.89 to 0.91 g/cc.

The alpha-olefin of the homogeneous ethylene/alpha-olefin preferably comprises at least one member selected from the group consisting of $C_3$–$C_3$ alpha-olefins; more preferably, $C_4$–$C_{12}$ alpha-olefins; and still more preferably $C_4$–$C_8$ alpha-olefins.

As a second aspect, the present invention is directed to a heat-shrinkable film comprising homogeneous ethylene/alpha-olefin copolymer, the heat-shrinkable film having an impact strength of from about 80 to 250 pounds and a total free shrink, at 185° F., of from about 30 to 150 percent. Preferably, the heat-shrinkable film has an impact strength of from about 80 to 200 pounds, and a total free shrink, at 185° F., of from about 50 to 120 percent.

This heat-shrinkable film can be a monolayer film or a multilayer film. Preferably, it is a multilayer film, and the layer comprising the homogeneous ethylene/alpha olefin copolymer is an inner layer.

As a third aspect, the present invention is directed to an article. The article comprises a heat-shrinkable film comprising a homogeneous ethylene/alpha-olefin copolymer, wherein the heat-shrinkable film has an impact strength of from about 35 to 200 pounds and a total free shrink, at 185° F., of from about 80 to 150 percent, and wherein the article is a member selected from the group consisting of a bag and a casing.

DETAILED DESCRIPTION OF THE INVENTION

Figure 1:
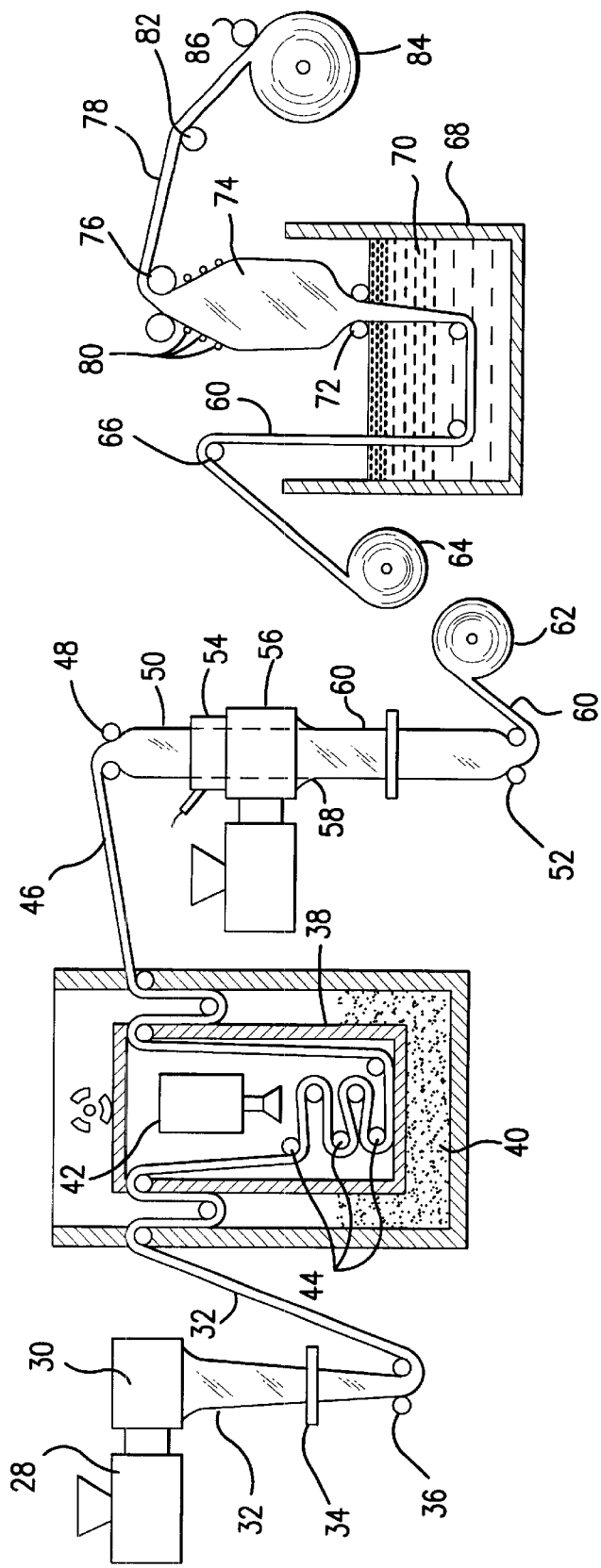
FIG. 1 illustrates a schematic view of a preferred process for making a multilayer film according to the present invention.

As used herein, the phrase "free shrink" refers to the percent dimensional change in a 10 cm×10 cm specimen of film, when shrunk at 185° F., with the quantitative determination being carried out according to ASTM D 2732, as set forth in the 1990 *Annual Book of ASTM Standards*, Vol. 08.02, pp.368–371, which is hereby incorporated, in its entirety, by reference thereto.

As used herein, the phrase "total free shrink" is determined by summing the percent free shrink in the machine direction with the percentage of free shrink in the transverse direction. For example, a film which exhibits 50% free shrink in the transverse direction and 60% free shrink in the machine direction, has a "total free shrink" of 110%. Unless specified otherwise, the phrase "free shrink", as used herein, refers to total free shrink. Preferably, the multilayer film of the present invention has a free shrink of at least 50 percent; more preferably, 55 to 200 percent; still more preferably, 55 to 110 percent; yet still more preferably 60 to 110 percent.

As used herein, the term "film" is used in a generic sense to include plastic web, regardless of whether it is film or sheet. Preferably, films of and used in the present invention have a thickness of 0.25 mm or less. As used herein, the term "package" refers to packaging materials used in the packaging of a product.

As used herein, the phrases "seal layer", "sealing layer", "heat seal layer", and "sealant layer", refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods.

In general, sealant layers employed in the packaging art have included the genus of thermoplastic polymers, including thermoplastic polyolefin, thermoplastic polyamide, thermoplastic polyester, and thermoplastic polyvinyl chloride.

As used herein, the term "seal" refers to any seal of a first region of a film surface to a second region of a film surface, wherein the seal is formed by heating the regions to at least their respective seal initiation temperatures. The heating can be performed by any one or more of a wide variety of manners, such as using a heated bar, hot air, infrared radiation, ultrasonic sealing, etc.

As used herein, the term "barrier", and the phrase "barrier layer", as applied to films and/or film layers, is used with reference to the ability of a film or film layer to serve as a barrier to one or more gases. In the packaging art, oxygen (i.e., gaseous $O_2$) barrier layers have, in general, included, for example, ethylene/vinyl alcohol copolymer, polyvinylidene chloride (PVDC), polyamide, polyester, polyacrylonitrile, etc., as known to those of skill in the art. However, in the present invention the barrier layer preferably comprises EVOH and/or PVDC.

As used herein, "EVOH" refers to ethylene/vinyl alcohol copolymer. EVOH includes saponified or hydrolyzed ethylene/vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50% and more preferably at least 85%.

As used herein, the phrase "abuse layer", as well as the phrase "puncture-resistant layer", refer to an outer film layer and/or an inner film layer, so long as the film layer serves to resist abrasion, puncture, and other potential causes of reduction of package integrity, as well as potential causes of reduction of package appearance quality.

As used herein, the term "core", and the phrase "core layer", as applied to multilayer films, refer to any internal film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrase "skin layer" refers to an outside layer of a multilayer film in packaging a product, this skin layer being subject to abuse.

As used herein, the phrase "tie layer" refers to any internal layer having the primary purpose of adhering two layers to one another. Tie layers can comprise any polymer having a polar group grafted thereon, so that the polymer is capable of covalent bonding to polar polymers such as polyamide and ethylene/vinyl alcohol copolymer.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

As used herein, the phrases "food-contact layer" and "meat-contact layer", refer to a layer of a multilayer film which is in direct contact with the food/meat in the package comprising the film. The food-contact/meat-contact layer is an outer layer of the multilayer film, in the sense that the food-contact/meat-contact layer is in direct contact with the meat product within the package. The food-contact/meat-contact layer is an inside layer in the sense that with respect to the packaged food product/meat product, the food-contact/meat-contact layer is the inside layer (i.e., innermost layer) of the package, this inside layer being in direct contact with the food/meat.

As used herein, the phrase "food-contact surface" and "meat-contact surface" refers to an outer surface of a food-contact layer/meat-contact layer, this outer surface being in direct contact with the food/meat within the package.

As used herein, the term "lamination", the term "laminate", and the phrase "laminated film", refer to the process, and resulting product, made by bonding together two or more layers of film or other materials. Lamination can be accomplished by joining layers with adhesives, joining with heat and pressure, and even spread coating and extrusion coating. The term laminate is also inclusive of coextruded multilayer films comprising one or more tie layers.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, or sometimes as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, the term "polymerization" is inclusive of homopolymerizations, copolymerizations, terpolymerizations, etc., and includes all types of copolymerizations such as random, graft, block, etc. In general, the polymers in the films used in accordance with the present invention, can be prepared in accordance with any suitable polymerization process, including slurry polymerization, gas phase polymerization, and high pressure polymerization processes.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, copolymers are identified, i.e, named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "polymerization units" derived from the monomers from which the copolymer is produced.

As used herein, the word "mer" refers to a unit of a polymer, as derived from a monomer used in the polymerization reaction. For example, an ethylene/alpha-olefin copolymer comprises ethylene mers and alpha-olefin mers. Mers are the "residue" of the monomer which reside as repeating units in the polymer chain.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER (™) linear homogeneous ethylene/alpha-olefin copolymers produced by Mitsui Petrochemical Corporation, using Ziegler-Natta catalysts), heterogeneous polymers typically contain a relatively wide variety of chain lengths and comonomer percentages.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally has ($M_w/M_n$) of less than 2.7; preferably from about 1.9 to 2.5; more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from heterogeneous polymers such as VLDPE, which generally has a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, homogeneous ethylene/alpha-olefin copolymers have a CDBI greater than about 70%, i.e., a CDBI of from about 70% to 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%.

Preferably, the homogeneous ethylene/alpha-olefin copolymers exhibit an essentially singular melting point characteristic, with a peak melting point ($T_m$), as determined by Differential Scanning Colornmetry (DSC), of from about 60° C. to 105° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a C4–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, U.S. Pat. No. 5,241,031, and PCT International Application WO 93/03093, each of which is hereby incorporated by reference thereto, in its entirely. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifing polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein, the phrase "modified polymer", as well as more specific phrases such as "modified ethylene/vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" and "anhydride-modified polymer", refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene-catalyzed EXACT (™) linear homogeneous ethylene/alpha olefin copolymer resins obtainable from the Exxon Chemical Company, of Baytown, Tex., and TAFMER (™) linear homogeneous ethylene/alpha-olefin copolymer resins obtainable from the Mitsui Petrochemical Corporation. AU these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from The Dow Chemical Company, known as AFFINITY (™) resins, are also included as another type of homogeneous ethylene/alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene/alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers simultaneously coextruded through an annular die.

As used herein, the term "adhered" is inclusive of films which are directly adhered to one another using a heat seal or other means, as well as films which are adhered to one another using an adhesive which is between the two films.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

A portion of the multilayer film of the present invention is preferably irradiated to induce crosslinking. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons, preferably using an electron accelerator, with a dosage level being determined by standard dosimetry methods. Other accelerators such as a Vander Graff or resonating transformer may be used. The radiation is not limited to electrons from an accelerator since any ionizing radiation may be used. The ionizing radiation can be used to crosslink the polymers in the film. Preferably, the film is irradiated at a level of from 2–15 MR, more preferably 2–10 MR. As can be seen from the descriptions of preferred films for use in the present invention, the most preferred amount of radiation is dependent upon the film and its end use.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness.

Corona treatment of polymeric materials is disclosed in U.S. Pat. No. 4,120,716, to BONET, issued Oct. 17, 1978, herein incorporated in its entirety by reference thereto. BONET discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material.

Since it is preferred to avoid irradiation of the polyvinylidene chloride-containing layer, and since the use of certain additives in an outer layer comprising ethylene/alpha-olefin copolymer renders the layer grease-resistant without the need to irradiate the layer, it is preferred to use such an additive on the outer film layer which is added in the extrusion coating step. In this preferred film, the other outer film layer, which is the inside coextruded layer, is preferably rendered grease-resistant by irradiation, in order to avoid the use of a more expensive additive, as well as to eliminate the need to blend the additive with polymer making up this inside coextruded layer.

Unless stated otherwise, all percentages disclosed above are based on weight, rather than volume.

Preferably, a multilayer film according to the present invention comprises a total of from 2 to 20 layers; more preferably, from 2 to 12 layers; and still more preferably, from 4 to 9 layers. Although multilayer films according to the present invention can have any total thickness desired, so long as the film provides the desired properties for the particular packaging operation in which the film is used, e.g. optics, modulus, seal strength, etc.

In the process illustrated in FIG. 1, solid polymer beads (not illustrated) are fed to a plurality of extruders 28 (for simplicity, only one extruder is illustrated). Inside extruders 28, the polymer beads are forwarded, melted, and degassed, following which the resulting bubble-free melt is forwarded into die head 30, and extruded through an annular die, resulting in tubing 32 which is preferably about 24 mils thick.

After cooling or quenching by water spray from cooling ring 34, tubing 32 is collapsed by pinch rolls 36, and is thereafter fed through irradiation vault 38 surrounded by shielding 40, where tubing 32 is irradiated with high energy electrons (i.e., ionizing radiation) from iron core transformer accelerator 42. Tubing 32 is guided through irradiation vault 38 on rolls 44. Preferably, tubing 32 is irradiated to a level of from about 3 to 8 MR.

After irradiation, irradiated tubing 46 is directed through pinch rolls 48, following which irradiated tubing 46 is slightly inflated, resulting in trapped bubble 50. However, at trapped bubble 50, the tubing is not significantly drawn longitudinally, as the surface speed of nip rolls 52 are about the same speed as nip rolls 48. Furthermore, irradiated tubing 46 is inflated only enough to provide a substantially circular tubing without significant transverse orientation, i.e., without stretching.

Slightly inflated, irradiated tubing 50 is passed through vacuum chamber 54, and thereafter forwarded through coating die 56. Second tubular film 58 is melt extruded from coating die 56 and coated onto slightly inflated, irradiated tube 50, to form two-ply tubular film 60. Second tubular film 58 preferably comprises an $O_2$ barrier layer, which does not pass through the ionizing radiation. Further details of the above-described coating step are generally as set forth in U.S. Pat. No. 4,278,738, to BRAX et. al., which is hereby incorporated by reference thereto, in its entirety.

After irradiation and coating, two-ply tubing film 60 is wound up onto windup roll 62. Thereafter, windup roll 62 is removed and installed as unwind roll 64, on a second stage in the process of making the tubing film as ultimately desired. Two-ply tubular film 60, from unwind roll 64, is unwound and passed over guide roll 66, after which two-ply tubular film 60 passes into hot water bath tank 68 containing hot water 70. The now collapsed, irradiated, coated tubular film 60 is submersed in hot water 70 (having a temperature of about 185° F.) for a retention time of at least about 30 seconds, i.e., for a time period in order to bring the film up to the desired temperature for biaxial orientation. Thereafter, irradiated tubular film 60 is directed through nip rolls 72, and bubble 74 is blown, thereby transversely stretching tubular film 60. Furthermore, while being blown, i.e., transversely stretched, nip rolls 76 draw tubular film 60 in the longitudinal direction, as nip rolls 76 have a surface speed higher than the surface speed of nip rolls 72. As a result of the transverse stretching and longitudinal drawing, irradiated, coated biaxially-oriented blown tubing film 78 is produced, this blown tubing preferably having been both stretched in a ratio of from about 1:1.5–1:6, and drawn in a ratio of from about 1:1.5–1:6. More preferably, the stretching and drawing are each performed a ratio of from about 1:2–1:4. The result is a biaxial orientation of from about 1:2.25–1:36, more preferably, 1:4–1:16. While bubble 74 is maintained between pinch rolls 72 and 76, blown tubing 78 is collapsed by rolls 80, and thereafter conveyed through pinch rolls 76 and across guide roll 82, and then rolled onto wind-up roll 84. Idler roll 86 assures a good wind-up.

Figure 2:
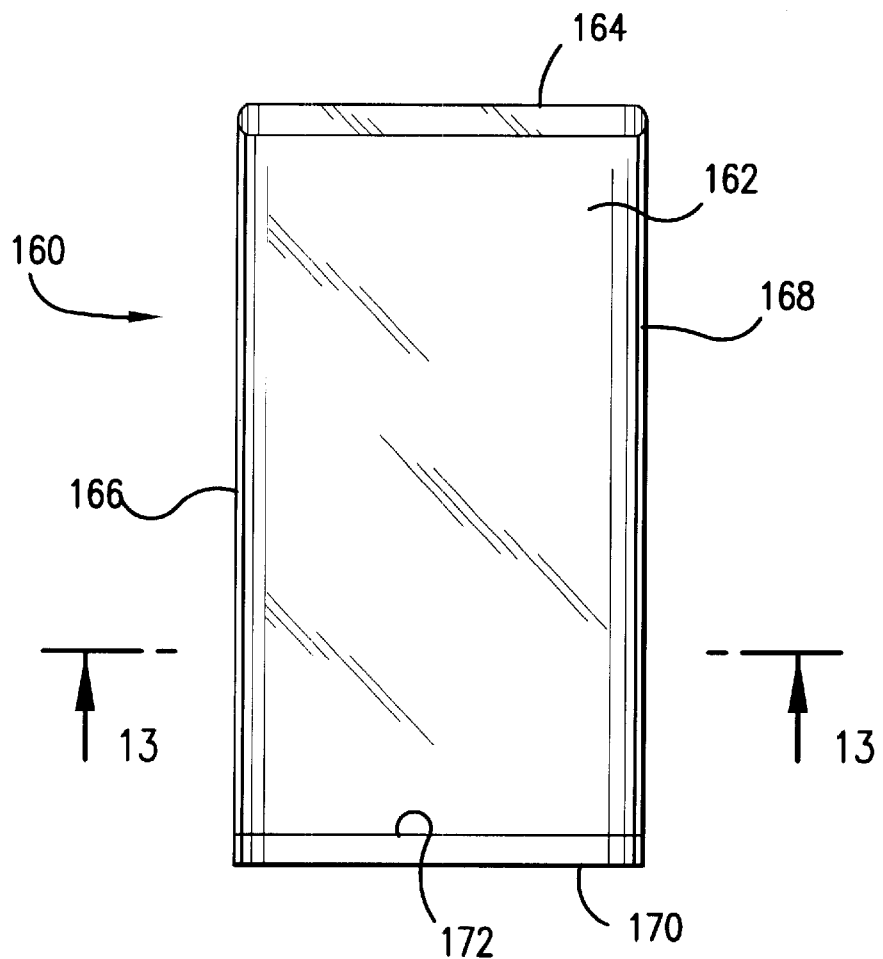
FIG. 2 illustrates a schematic of an end-seal bag in accordance with the present invention, in lay-flat view.
Figure 3:
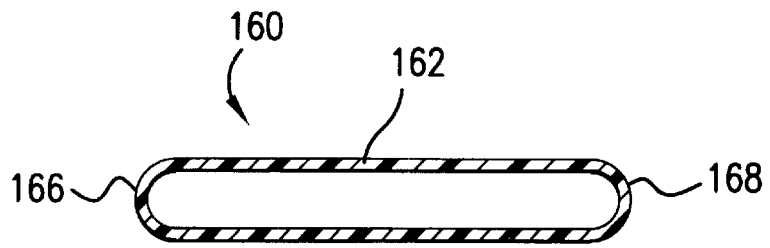
FIG. 3 illustrates a cross-sectional view of the end-seal bag illustrated in FIG. 2, taken through section 13—13 of FIG. 2.

FIG. 2 is a schematic of a preferred end seal bag 160, in a lay-flat position, this bag being in accord with the present invention; FIG. 3 is a cross-sectional view of bag 160 taken through section 13—13 of FIG. 2. Viewing FIGS. 2 and 3 together, bag 160 comprises bag film 162, top edge 164 defining an open top, first bag side edge 166, second bag side edge 168, bottom edge 170, and end seal 172.

Figure 4:
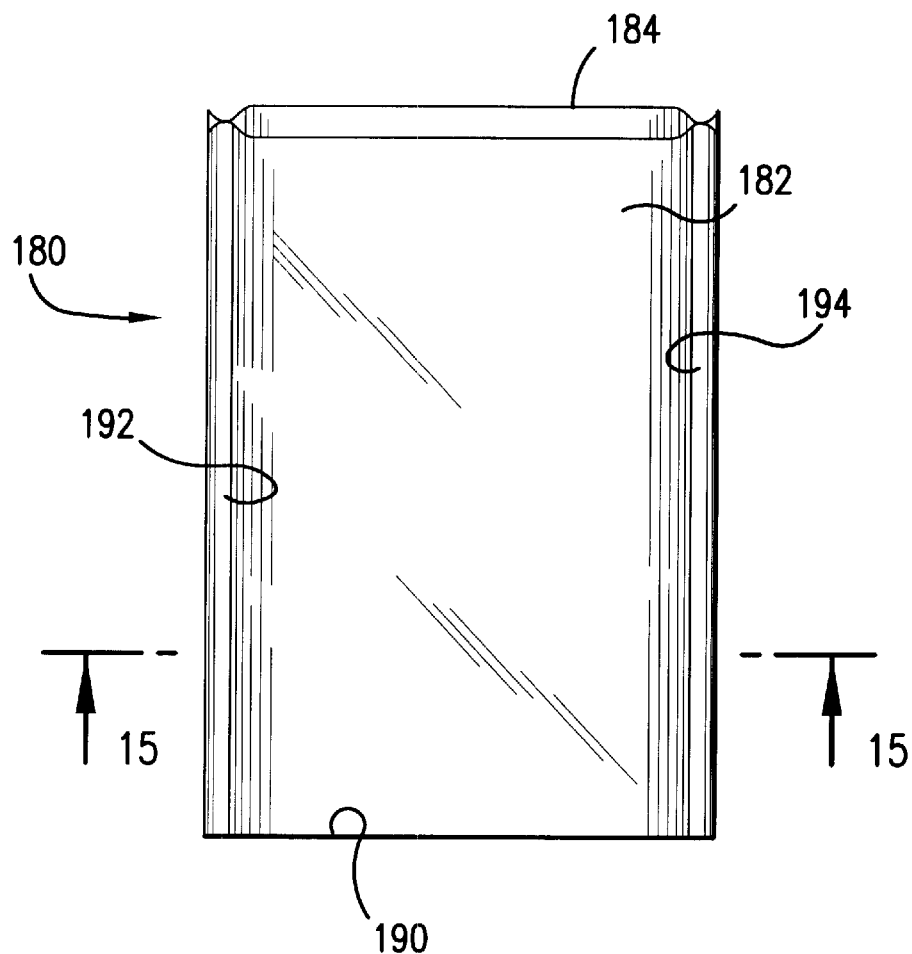
FIG. 4 illustrates a schematic of a side-seal bag in accordance with the present invention, in lay-flat view.
Figure 5:
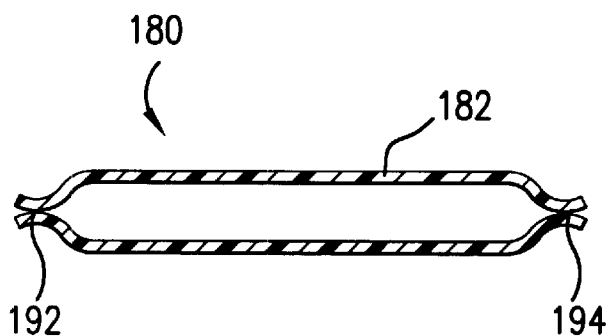
FIG. 5 illustrates a cross-sectional view of the side-seal bag illustrated in FIG. 4, taken through section 15—15 of FIG. 4.

FIGS. 4 and 5 illustrate bag 180, an alternative bag according to the present invention. Bag 180 is a "side seal" bag. FIG. 4 illustrates a schematic of side seal bag 180, in a lay-flat view; FIG. 5 illustrates a cross-sectional view taken through section 15—15 of FIG. 4. With reference to FIGS. 4 and 5 together, side seal bag 180 is comprised of bag film 182, top edge 184 defining an open top, bottom edge 190, first side seal 192, and second side seal 194.

Figure 6:
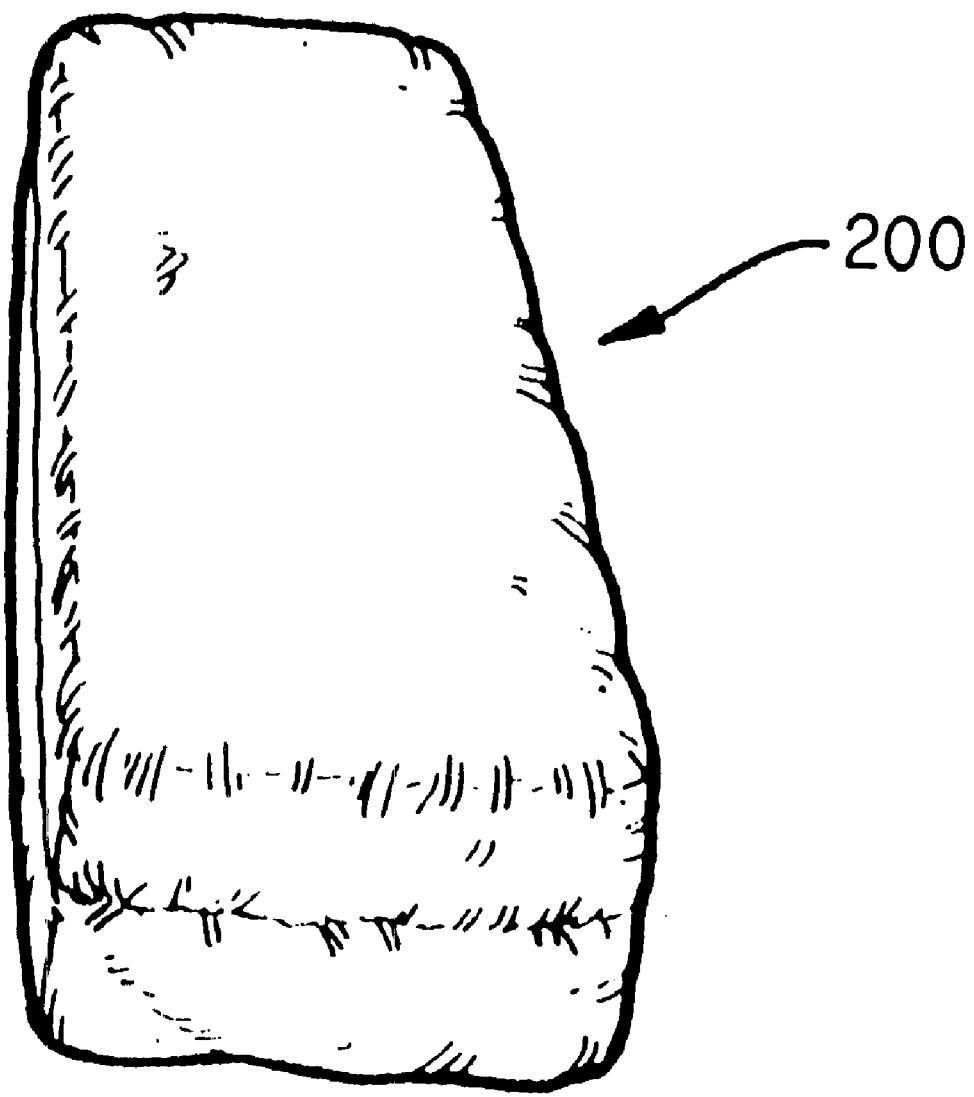
FIG. 6 illustrates a perspective view of a packaged product according to the present invention.

FIG. 6 illustrates packaged meat product 200 according to the present invention. Packaged meat product 200 comprises a sealed package within which is a meat product, such as a boneless ham product. The sealed package is preferably formed using a bag according to the present invention, with the product being packaged in the bag, followed by evacuation, sealing, and shrinking of the bag, to result in packaged meat product 200.

The following examples are representative of the preferred embodiments of the present heat shrinkable films containing homogeneous linear ethylene alpha-olefin copolymers. In order to evaluate such films the following tests were employed:

Tensile Strength: A measure of the force required under constant elongation to break a specimen of the film; measured by ASTM D 882.

Elongation: A measure of the percent extension required to break a specimen of the film; measured by ASTM D 882.

Modulus: The ratio of the change in force to the change in elongation in the straight line portion of an Instron Tensile Testing curve; measured by ASTM D 882—Method A.

Tear Propagation: The force required to propagate a tear from a tiny slit made by a sharp blade in a specimen of the film; measured by ASTM D 1938.

Free Shrink: The percent dimensional change in a 10 cm.×10 cm. specimen of film when subjected to a selected heat; measured by ASTM D 2732.

Ball Burst: The energy necessary to burst and penetrate a restrained specimen of film; measured by ASTM D 3420.

Instrumented Impact: The energy necessary to puncture a restrained specimen of film, similar to ball burst, defined above. However, the Instrumented Impact Tester has the ability to measure the tensile/elongation curve to break. The "gradient" is the ratio of the change in force to change in elongation in the straight line portion of the curve. "Peak" is a measure of the maximum force exerted on the specimen to impart rupture. "Impact Energy" is a measure of the energy absorbed by the sample prior to rupture. Instrumented Impact is measured by ASTM D 3763.

As used herein, the phrase "impact strength" refers to both the peak load and energy absorbed, regardless of whether the test is carried out via dart drop or via instrumented impact. As known to those of skill in the art, peak load values from dart drop substantially correspond with peak load from instrumented impact, and energy absorbed values obtained via dart drop substantially correspond with energy absorbed values obtained via instrumented impact, so long as the same impingement speed is present. The values reported herein were obtained at an impingement speed of about 12 feet per second.

Haze: The percentage of transmitted light which is scattered forward while passing through a specimen; measured by ASTM D 1003—Method A.

Clarity: A measure of the distortion of an image viewed through a specimen; measured by ASTM D 1746.

Gloss: The surface reflectance or shine of a specimen; measured by ASTM D 2457.

Parallel Plate: A bag is confined between two plates a specified distance apart and is inflated until its seal fails. The pressure level inside the bag at the point of failure is a measure of seal quality. Results are reported in inches of water pressure (IOWP).

LRHB (Linear Ramped Hot Burst): A clean sealed bag is inflated to a specified dwell pressure and the seal area is submerged in hot water at 182° F. After five seconds the pressure inside the bag is increased at the rate of 2 inches of water/second. The time to failure and burst pressure is a measure of seal quality. Test results are reported in seconds and inches of water pressure (IOWP).

LRHB-G (Linear Ramped Hot Burst—Grease): The procedure is the same as the LRHB test described above except peanut oil is first applied to the seal area.

VPHB (Variable Pressure Hot Burst): As with the LRHB test described above, a clean sealed bag is inflated to a specified dwell pressure and the seal area is submerged in hot water at 182° F. After five seconds the pressure inside the bag is increased at a specified rate ranging 1 to 7 inches of water/second. Here again, test results are reported as seconds and inches of water pressure (IOWP).

VPHB-G (Variable Pressure Hot Burst—Grease): The procedure is the same as the VPHB test described above except peanut oil is first applied to the seal area.

Gel: A measure of the relative amount of ultra high molecular weight polymer present in a sample. A gel measurement can provide an indication of the level of crosslinking which is present in a sample since the amount of polymer which is collected as gel increases with crosslinking. Gel is determined by solvent extraction with boiling toluene. In this method a specimen weighting 0.4 grams is extracted for 21 hours in a cellulose thimble, removed, dried and reweighed. The percentage of gel is calculated by taking the ratio of the polymer remaining (toluene insoluble fraction) to the original weight. However, a gel value of 0% cannot reliably indicate that no crosslinking has occurred. Rather, the level of crosslinking may not be great enough to provide measurable gel.

DSC: The differential scanning calorimeter (DSC) is an instrument which measures the heat flow to a polymer sample during the programmed heating of it at 10° C. per minute. The trace obtained from the DSC can be used to characterize a sample's starting and ending melting point as well as its peak melting point(s).

Polydispersity (Mw/Mn): A measure of the uniformity of chain lengths within a polymer sample. It defines the breadth of molecular weight distribution. It is obtained by dividing the weight average molecular weight (Mw) by the number average molecular weight (Mn). The Mw and Mn are determined by Gel Permeation Liquid Chromatography.

EXAMPLE 1

Approximately 30 ml of resin pellets of Exxon SLP 3010A, a 0.910 density homogeneous ethylene butene copolymer having a 1.0 melt index were placed in the center of the mylar sheets of a press assembly, as described above. The assembly was held at 320° F. for 1 minute without applied pressure. At 30 and 45 seconds the top press plate was lowered as close as possible without applying pressure. The pressure was then increased to 500 psi and was maintained for 1 minute. The mylar sheets with the platen sandwiched therebetween were removed from the hot steel plates to allow the plates to cool to ambient temperature. The thickness of the platen was measured at several sites and ranged from 15–18 mils.

The platen was then oriented on the T.M. Long Stretcher laboratory orientation unit at the University of Tennessee, Knoxville, Tennessee. The orientation conditions were as follows: air temperature=95° C.; dwell time=10 sec.; stretch ratio=3.5×3.5; strain ratio=2000%; plate temperature=120° C. The final film thickness was approximately 1 mil.

EXAMPLE 2

A sample of Exxon SLP 3011D, a 0.902 density homogeneous ethylene hexene copolymer having a 1.0 melt index was formed into a film and oriented in accordance with the procedures set forth in Example 1. The orientation conditions were as follows: air temperature=88° C.; dwell time=15 sec.; stretch ratio=3.5×3.5; strain ratio=2000%; plate temperature=105° C. The final film thickness was approximately 1 mil.

EXAMPLE 3

A second sample of Exxon SLP 3011D was formed into a film and oriented in accordance with the procedures set forth in Example 1. The orientation conditions were as follows: air temperature=78° C.; dwell time=20 sec.; stretch ratio=3.5×3.5; strain ratio=2000%; plate temperature=95° C. The final film thickness was approximately 1 mil.

EXAMPLE 4

A third sample of Exxon SLP 3011D was formed into a film and oriented in accordance with the procedures set forth in Example 1. The orientation conditions were as follows: air temperature=78° C.; dwell time=30 sec.; stretch ratio=3.5×3.5; strain ratio=2000%; plate temperature=95° C. The final film thickness was approximately 1 mil.

EXAMPLE 5 (PRIOR ART)

A sample of Dowlex 2045 from Dow, a heterogeneous ethylene octene copolymer having a density of 0.920, was made into a film and oriented in accordance with the procedures set forth in Example 1 for comparative purposes. The orientation conditions were as follows: air temperature=105° C.; dwell time=30 sec.; stretch ratio=3.5×3.5; strain ratio=4000%; plate temperature=105° C. The resultant oriented film had a thickness of approximately 1 mil.

EXAMPLE 6

Two platens made from Fina 8473, an ethylene propylene copolymer (EPC) with 3.1% by weight ethylene were pressed in accordance with the film formation process set forth in Example 1. A third platen formed of Exxon SLP 3011A, a homogeneous ethylene hexene copolymer having a density of 0.910 g/cc and a 1.0 M.I. made by the process of Example 1 was placed between the two EPC platens. The three layers were then pressed under heat and pressure to weld the three into a single multilayer film.

The multilayer film was then oriented on the T.M. Long-stretcher laboratory orientation unit at the University of Tennessee, Knoxville, Tenn. The orientation conditions were as follows: air temperature=105° C.; dwell time=30 sec.; stretch ratio=4.0×4.0; strain ratio=3900%; plate temperature=105° C. The final film thickness was approximately 1 mil.

EXAMPLE 7

As set forth in Example 6 above, a multilayer film was produced by pressing a platen of Exxon SLP 3011D (made by the process of Example 1) between two platens of ethylene propylene copolymer.

The film was oriented under the following conditions: air temperature=100° C.; dwell time=30 sec.; stretch ratio=4.0×4.0; strain ratio=3900%; plate temperature=100° C. The final film thickness was approximately 1 mil.

EXAMPLE 8 (PRIOR ART)

As set forth in Example 7 above, a multilayer film was produced by pressing a platen of Dowlex 2045 between two platens of ethylene propylene copolymer for comparative purposes.

The film was oriented under the following condition: air temperature=114.5° C.; dwell time=30 sec.; stretch ratio=4.0×4.0; strain ratio=3900%; plate temperature=115° C. The final film thickness was approximately 1 mil.

EXAMPLE 9

Several physical properties of the oriented monolayer film samples of Example 1–5 were evaluated and are given below in Table 1. The film of Example 5 is representative of the prior art and is given for comparative purposes.

TABLE 1

| Property/ | Film of | | | | |
| --- | --- | --- | --- | --- | --- |
| | Ex. 1 | Ex. 2 | Ex. 3 | Ex. 4 | Ex. 5 |
| Tensile, psi | 15,300 | 22,917 | 19,088 | 18,822 | 13,500 |
| Elongation, % | 142 | 160 | 201 | 175 | 181 |
| Modulus, psi | 27,000 | 16,504 | 13,502 | 14,912 | 46,000 |
| Tear Propagation grams | 88 | 10 | 87 | 54 | 110 |
| Free Shrink, % (at 200° F.) | 13/10 | 43/38 | 50/48 | 55/53 | 3/6 |
| Ball Burst cm - kg | 11.0 | 45 | 50+ | 50+ | 5.3 |
| Instrumented Impact | 15.0 | 31 | 65 | 60 | 5.0 |
| Haze, % | 5.9 | 0.5 | 1.0 | 1.4 | 2.7 |
| Clarity, % | 44 | 89 | 81 | 83 | 80 |
| Gloss, 45 deg. | 65 | 95 | 89 | 88 | 77 |

The numbers shown for tear propagation for each film are subject to a very high standard deviation.

EXAMPLE 10

As in Example 9 above, several physical properties of the oriented multilayer film samples of Examples 6–8 were evaluated and are given in Table II below. The film of Example 8 is representative of the prior art and is given for comparative purposes.

TABLE II

| Property/ | Film of | | |
| --- | --- | --- | --- |
| | Ex. 6 | Ex. 7 | Ex. 8 |
| Tensile, psi | 9100 | 7027 | 8000 |
| Elongation, % | 77 | 82 | 91 |
| Modulus, psi | 85,800 | 66,623 | 75,000 |
| Tear Propagation grams | 4.5 | 5 | 15.8 |
| Free Shrink, % | 7-6 | 11-13 | 3-2 |
| Ball Burst cm - kg | 5 | 6 | 4 |
| Instrumented Impact | 10 | 7 | 8 |
| Haze, % | 1.1 | 1.5 | 2.2 |
| Clarity, % | 85 | 85 | 24 |
| Gloss, 45 deg. | 89 | 84 | 85 |

EXAMPLE 11

A three layer coextruded precursor film having the structure inner layer/core layer/outermost adhesive layer was formed. The inner layer was Elvax 3128 from DuPont, an ethylene vinyl acetate with 8.9% vinyl acetate (EVA-1); the core layer was Exxon SLP 3011D; and the outermost layer was Escorene LD-720.92 from Exxon, an ethylene vinyl acetate having 19% vinyl acetate (EVA-2). The precursor film was irradiated to 2 MR and thereafter extrusion coated with a barrier layer of a vinylidene chloride methyl acrylate from Dow and an outer abuse layer of LD 318.92 from Exxon, an ethylene vinyl acetate with 9% VA (EVA-3) to yield a resultant five layer film having the basic structure.:

EVA-1/core/EVA-2/barrier/EVA-3.

The five layer film was then oriented by a trapped bubble method out of hot water with both the preheat and hot bath temperatures at 195° C.

EXAMPLES 12–22

The procedure set forth in Example 11 was repeated eleven times, each time resulting in the basic structure:

EVA-1/core/EVA-2/Saran MA/EVA-3.

Table III, below, outlines the variations in irradiation dosage, orientation preheat and hot bath temperatures and core layer composition. Example 1922 are representative of the prior art and are shown for comparative purposes.

TABLE III

| Example # | Dose | Preheat | Hotbath | Core |
|---|---|---|---|---|
| 11 | 2 MR | 195 | 195 | SLP 3011D |
| 12 | 4 MR | 195 | 195 | SLP 3011D |
| 13 | 2 MR | 210 | 210 | SLP 3011D |
| 14 | 4 MR | 210 | 210 | SLP 3011D |
| 15 | 2 MR | 195 | 195 | SLP 3011B |
| 16 | 4 MR | 195 | 195 | SLP 3011B |
| 17 | 2 MR | 210 | 210 | SLP 3011B |
| 18 | 4 MR | 210 | 210 | SLP 3011B |
| 19 | 2 MR | 195 | 195 | Attane 4203 |
| 20 | 4 MR | 195 | 195 | Attane 4203 |
| 21 | 2 MR | 210 | 210 | Attane 4203 |
| 22 | 4 MR | 210 | 210 | Attane 4203 |

Exxon SLP 3011B is a homogeneous ethylene hexene copolymer having a density of 0.905 g/cc and a 2.1 M.I. Attane 4203 is a heterogeneous ethylene octene copolymer having a density of 0.905 g/cc.

The oriented multilayer films of Examples 11–22 were tested for free shrink and instrumented impact with the results given below in Table IV. It may be seen that when comparing the metallocene resin films of Examples 11 and 15 or 12 and 16 with the comparative example counterparts of 19 and 20, a substantial improvement in impact resistance is seen. Similarly, a comparison of Examples 13 and 17 or 14 and 18 with their respective comparative heterogeneous Examples 21 and 22 show an improved impact for the metallocene resins.

TABLE IV

| | Free Shrink | | Instrumented Impact | | |
|---|---|---|---|---|---|
| Ex. # | L | T | Peak lbs. | Grad lb/in. | Energy ft.lb |
| 11 | 31 | 45 | 86.8 | 56.9 | 5.97 |
| 12 | 31 | 45 | 86.0 | 55.2 | 6.06 |
| 13 | 14 | 34 | 37.1 | 33.2 | 1.96 |
| 14 | 17 | 34 | 46.4 | 33.5 | 2.74 |
| 15 | 30 | 41 | 77.4 | 53.5 | 5.34 |
| 16 | 30 | 42 | 71.9 | 51.6 | 4.12 |
| 17 | 17 | 35 | 43.5 | 37.2 | 2.73 |
| 18 | 18 | 34 | 56.4 | 37.9 | 4.17 |
| 19 | 30 | 45 | 54.2 | 46.0 | 2.91 |
| 20 | 30 | 45 | 55.1 | 49.4 | 2.63 |

TABLE IV-continued

| | Free Shrink | | Instrumented Impact | | |
|---|---|---|---|---|---|
| Ex. # | L | T | Peak lbs. | Grad lb/in. | Energy ft.lb |
| 21 | 20 | 37 | 40.9 | 37.6 | 1.95 |
| 22 | 21 | 38 | 46.1 | 40.8 | 2.20 |

As is evident in Table 1 above, Examples 2, 3, and 4 have surprisingly good impact and shrink results. As is evident from side-by-side comparisons, for example, Examples 11–14 vs 19–22, which provide comparatives for the orientation of the film under the same conditions (such as the orientation conditions in 11 & 12 vs. comparatives of 19 & 20), the surprising results of the present invention are apparent from the high impact strengths reported.

The surprising impact strength results for the films of the present invention are obtained by using a relatively low orientation temperature, such as 195° F. As the orientation temperature drops, the result is generally a film having a higher impact strength. However, it has been surprisingly found that films according to the present invention exhibit a much greater increase in impact strength as the orientation temperature is lowered from, for example, from 210° F. to 195° F., versus heterogeneous polymers such as ATTANE 4203 (see Example 11 and 12, and 15 and 16, versus 19 and 20).

EXAMPLE 23

A two layer coextruded precursor film was formed having an inner layer of Exxon SLP-1-277, as homogeneous ethylene butene copolymer having a density of 0.900 g/cc and a 2.0 M.I. and a second layer of Excorene LD-720.92 from Exxon, EVA-1.

Following irradiation the precursor film was extrusion coated with a barrier layer of a vinylidene chloride methyl acrylate supplied by Dow and an outer layer of LD 318-92 from Exxon, EVA-2. Thereafter the total structure was oriented out of hot water by a trapped bubble technique. The final film structure and target percent thickness per layer was:

SLP-1-277/EVA-1/Saran/EVA-2;

14.71%; 50.84%; 9.24%; 25.21%.

EXAMPLE 24

The procedure set forth in Example 23 was repeated with the exception that the inner layer of the precursor film was Exxon SLP-1-291, a homogeneous ethylene butene copolymer having a density of 0.904 g/cc and a 2.5 M.I.

EXAMPLE 25

The procedure set forth in Example 23 was repeated with the exception that the inner layer of the precursor film was Exxon SLP-1-342, a homogeneous ethylene hexene copolymer having a density of 0.905 g/cc and 1.5 M.I

EXAMPLE 26

For comparative purposes the procedure set forth in Example 23 was repeated with the exception that the inner layer of the precursor film was a blend of 90% by weight of NA 295-000 an ethylene vinyl acetate copolymer having 6.7% vinyl acetate supplied by Quantum, and 10% by weight of Dowlex 2045, a heterogeneous ethylene octene copolymer having a density of 0.920 g/cc, supplied by Dow. Such blend in a heat sealing layer is representative of the prior art.

EXAMPLES 27–38

The film tubing produced in each of Examples 23–26 was converted to eight inch side seal bags with the side seal machine running at 100 bags/minute at 6.0, 7.5 and 9.0 amps, respectively. Only very weak seals could be formed for each structure below 6.0 amps and sealing above 9.0 amps was precluded by puckering.

The samples were subjected to parallel plate, VPHB and VPHB-G tests. The results are shown in Table V below.

TABLE V

| Ex. # | Film of | Amps | Parallel Plate | VPHB | VPHB-G |
|---|---|---|---|---|---|
| 27 | 23 | 6.0 | 123.3 | 7.4 | 4.6 |
| 28 | 23 | 7.5 | 120.8 | 13.4 | 10.7 |
| 29 | 23 | 9.0 | 144.8 | 13.3 | 12.6 |
| 30 | 24 | 6.0 | 138.6 | 0 | 7.6 |
| 31 | 24 | 7.5 | 143.4 | 14.1 | 10.7 |
| 32 | 24 | 9.0 | 140.9 | 15.5 | 13.2 |
| 33 | 25 | 6.0 | 138.0 | 24.5 | 22.9 |
| 34 | 25 | 7.5 | 148.0 | 31.1 | 32.6 |
| 35 | 25 | 9.0 | 147.7 | 33.1 | 33.4 |
| 36 | 26 | 6.0 | 146.9 | 20.4 | 14.5 |
| 37 | 26 | 7.5 | 145.9 | 21.7 | 19.7 |
| 38 | 26 | 9.0 | 159.0 | 23.4 | 22.9 |

EXAMPLE 39

A two layer coextruded precursor film was formed having an inner layer of Exxon SLP 9017 a homogeneous ethylene hexene copolymer having a density of 0.920 g/cc and a 3.0 M.I. and an outermost layer of Excorene LD 720.92 from Exxon, EVA-1.

Following irradiation the precursor film was extrusion coated with a first barrier layer of a vinylidene chloride methyl acrylate supplied by Dow, a second layer of EVA-1 and an abuse layer of LD 318.92 from Exxon, EVA-2. The film structure was then oriented out of hot water by a trapped bubble technique. The final overall structure and target percent thickness per layer was:

SLP 9017/EVA-1//Saran/EVA-1/EVA-2;

14.58%; 50.42%; 10%; 12.5%; 12.5%.

EXAMPLE 40

The procedure set forth in Example 39 was repeated with the exception that the inner layer of the precursor film was formed of a blend of 90% by weight of Exxon SLP 9017 and 10% by weight of Exxon SLP 4008, a homogeneous ethylene hexene copolymer having a density of 0.885 g/cc and a 4 M.I.

EXAMPLE 41

The procedure set forth in Example 39 was repeated with the exception that the inner layer of the precursor film was formed of a blend of 80% by weight of Exxon SLP 9017 and 20% by weight Exxon SLP 4008.

EXAMPLE 42

The procedure set forth in Example 39 was repeated with the exception that the inner layer of the precursor film was formed of a blend of 70% by weight of Exxon SLP 9017 and 30% by weight of Exxon SLP 4008.

EXAMPLE 43

The procedure set forth in Example 39 was repeated with the exception that the inner layer of the precursor film was formed of a blend of 60% by weight of Exxon SLP 9017 and 40% by weight of Exxon SLP 4008.

EXAMPLE 44

The procedure set forth in Example 39 was repeated with the exception that the inner layer of the precursor film was formed of a blend of 90% by weight of Dowlex 2045 and 10% by weight of Exxon SLP 9013, a homogeneous ethylene hexene copolymer having a density of 0.898 g/cc and a 3.2 M.I.

EXAMPLE 45

The procedure set forth in Example 39 was repeated with the exception that the inner layer of the precursor film was formed of a blend of 80% by weight of Dowlex 2045 and 20% by weight of Exxon SLP 9013.

EXAMPLE 46

The procedure set forth in Example 39 was repeated with the exception that the inner layer of the precursor was formed of a blend of 70% by weight of Dowlex 2045 and 30% by weight of Exxon SLP 9013.

EXAMPLE 47

The procedure set forth in Example 39 was repeated with the exception that the inner layer of the precursor film was formed of a blend of 60% by weight of Dowlex 2045 and 40% by weight of Exxon SLP 9013.

EXAMPLES 48–57

The films of Examples 39–47 and Example 26 were formed into side seal bags and were subjected to parallel plate, LRHB-G (linear ramped hot burst grease) and VPHB-G tests. Results for all three tests for each sample are given in Table VI below.

Example 57 represents test results for the film of Example 26, the closest available prior art structure.

TABLE VI

| | FILM OF | PP | LRHB-G | | LPHB-G | |
|---|---|---|---|---|---|---|
| EX # | EX. # | IOWP | SEC | IOWP | SEC | IOWP |
| 48 | 39 | 172 | 21 | 44 | 44 | 45 |
| 49 | 40 | 168 | 20 | 41 | 43 | 45 |
| 50 | 41 | 152 | 18 | 38 | 44 | 40 |
| 51 | 42 | 142 | 17 | 36 | 42 | 39 |
| 52 | 43 | 138 | 17 | 35 | 49 | 35 |
| 53 | 44 | 130 | 17 | 35 | 35 | 37 |
| 54 | 45 | 136 | 18 | 37 | 42 | 38 |
| 55 | 46 | 151 | 19 | 38 | 49 | 41 |
| 56 | 47 | 146 | 19 | 38 | 56 | 38 |
| 57 | 26 | 145 | 16 | 30 | 28 | 33 |

EXAMPLES 58–61

Four monolayer platens were pressed from samples of Exxon SLP 3011A, a homogeneous ethylene hexene copolymer having a density of 0.910 and a 1.0 M.I. substantially as described by the film forming process of Example 1 above.

One platen was not irradiated while the other three were irradiated to dosages of 3 MR, 4.5 MR and 7 respectively. Thereafter, each platen was oriented on the T.M. Long Stretcher substantially as described in the orientation procedure of Example 1 above. Each platen was oriented at 92° C. Thereafter, the resultant oriented films were measured for percent gel and instrumented impact at peak load and energy to break. The results are detailed in Table VII below.

TABLE VII

| EX # | MR | % GEL | INSTRUMENTED IMPACT Peak (lb) |
|---|---|---|---|
| 58 | 0 | 0 | 38 |
| 59 | 3 | 0 | 47 |
| 60 | 4.5 | 32.7 | 42 |
| 61 | 7 | 56.0 | 39 |

EXAMPLES 62–65

Four monolayer platens were pressed from samples of Exxon SLP 3011D by the procedure set forth above for Examples 58–61. However, each platen was oriented at 85° C. Test results are shown in Table VIII below.

TABLE VIII

| EX # | MR | % GEL | INSTRUMENTED IMPACT Peak (lb) |
|---|---|---|---|
| 62 | 0 | 0 | 40 |
| 63 | 3 | 0 | 39 |
| 64 | 4.5 | 23.2 | 42 |
| 65 | 7 | 56.0 | 47 |

EXAMPLES 66–73

The films of Examples 58–65 above were tested to determine tensile strength elongation and modulus in both the transverse and longitudinal directions. The results are given in Table IX below.

TABLE IX

| Ex # | Film of Ex. # | Tensile (psi) L/T | Elongation (%) L/T | Modulus x 1000 (psi) L/T |
|---|---|---|---|---|
| 66 | 58 | 15400/19500 | 115/215 | 21.9/29.5 |
| 67 | 59 | 17300/17700 | 120/200 | 24.7/17.5 |
| 68 | 60 | 16200/20400 | 105/270 | 24.9/27.0 |
| 69 | 61 | 23500/16000 | 150/150 | 17.2/28.8 |
| 70 | 62 | 14800/15000 | 160/210 | 11.1/15.5 |
| 71 | 63 | 20200/10100 | 160/180 | 10.6/14.3 |
| 72 | 64 | 17500/12200 | 140/180 | 13.3/8.4 |
| 73 | 65 | 15000/13000 | 140/190 | 10.3/12.7 |

EXAMPLE 74

A two layer coextruded precursor film was formed having an inner layer of LD 318.92 from Exxon, EVA-1, and a second layer of Exxon SLP 3010D, a homogeneous ethylene butene copolymer having a density of 0.902 and a 1.0 M.I. The precursor film was irradiated at a dosage of 4.5 MR.

Thereafter, the precursor film was extrusion coated with a barrier layer of a vinylidene chloride methyl acrylate supplied by Dow, and then a layer of EP 4062-3 an ethylene vinyl acetate having 15% vinyl acetate EVA-2 and an abuse layer of EVA-1.

The total structure was oriented out of hot water with a preheat temperature of 195° C. and a hot bath temperature of 188° C. The resultant oriented film had a structure and percent thickness per layer as follows:

EVA-1/SLP 3010D//Saran/EVA-2/EVA-1; 14.29%; 51.43%; 9.80; 16.33%; 8.16.

EXAMPLE 75

The procedure set forth in Example 74 was repeated with the exception that the total structure was oriented out of hot water with a preheat temperature of 188° C. and a hot bath temperature of 181° C.

EXAMPLE 76

The procedure set forth in Example 74 was repeated with the exception that the second layer of the precursor film was Exxon SLP 3011D and the total structure was oriented out of hot water with a preheat temperature of 188° C. and a hot bath temperature of 181° C.

EXAMPLES 77–79

The films made by the procedures of Examples 74–76 above were tested for instrumented impact at peak load and energy to break as well as free shrink at 195° F. in both the longitudinal and transverse directions. The results of these tests are given in

TABLE X

| Ex.# | Film of Ex.# | Instrumented Impact Peak | Free Shrink L | Free Shrink T |
|---|---|---|---|---|
| 77 | 74 | 68.1 | 51 | 63 |
| 78 | 75 | 66.3 | 51 | 63 |
| 79 | 76 | 86.4 | 45 | 56 |

EXAMPLE 80

A palindromic five layer coextruded film having an A/B/C/B/A structure was oriented out of hot air at 115° C. The skin layers A were each 100% of Exxon SLP 9017, a homogeneous ethylene hexene copolymer having a density of 0.920 g/cc. The internal layers B were each 100% of Dowlex 2045, a heterogeneous ethylene octene copolymer having a density of 0.920 g/cc, supplied by Dow. The core layer C was 100% of PE 1335, an ethylene vinyl acetate having 3.3% vinyl acetate supplied by Rexene. The percent thicknesses of the layers were as follows:

| A | B | C | B | A |
|---|---|---|---|---|
| 16.7% | 25% | 16.7% | 25% | 16.7% |

EXAMPLE 81

A palindromic three layer coextruded film having an A/B/A structure was oriented out of hot air at 113° C. The skin layers A were a blend of 25% by weight of Exxon 3011D, a homogeneous ethylene hexene copolymer having a 0.902 g/cc density, 25% by weight of Dowlex 2037, a heterogeneous ethylene octene copolymer having a density of 0.935 g/cc supplied by Dow, and 50% by weight of Dowlex 2045. The percent thicknesses of the layers were as follows:

| A | / | B | / | A |
|---|---|---|---|---|
| 25% | | 50% | | 25% |

The oriented film had excellent optical properties. However, the slip properties were poor.

EXAMPLE 82

The procedure of Example 81 was repeated with the exception that the SLP 3011D of the skin layer was replaced with Exxon SLP 3011A, a homogeneous ethylene hexene copolymer having a density of 0.910 g/cc. Here again, the present oriented film had excellent optical properties.

EXAMPLE 83

The procedure of Example 81 was repeated with the exception that the skin layers A were a blend of 84% by weight of Exxon SLP 0233, a homogeneous ethylene hexene copolymer having a density of 0.922 and 16% by weight of Attane 4202, a heterogeneous ethylene octene copolymer having a density of 0.912 g/cc.

The foregoing description of preferred embodiments of the invention have been presented for purposes of illustration and description. It is not intended to be exhaustive or to limit the invention to the precise form disclosed, and modifications and variations are possible in light of the above teachings or may be acquired from practice of the invention. The embodiment were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A heat-shrinkable film comprising homogeneous linear ethylene/$C_{6-10}$ alpha-olefin copolymer, the heat-shrinkable film having an impact strength of from about 40 to 200 pounds and a total free shrink, at 185° F., of from about 80 to 150 percent.

2. The heat-shrinkable film according to claim 1, wherein the heat-shrinkable film has an impact strength of from about 40 to 90 pounds.

3. The heat-shrinkable film according to claim 2, wherein the heat-shrinkable film has a total thickness of from about 1 to 3 mils.

4. The heat-shrinkable film according to claim 3, wherein the heat-shrinkable film has a total free shrink at 185° F., of from about 80 to 120 percent.

5. The heat-shrinkable film according to claim 1, wherein the heat-shrinkable film is a monolayer film.

6. The heat-shrinkable film according to claim 1, wherein the heat-shrinkable film is a multilayer heat-shrinkable film, and the layer comprising the homogeneous ethylene/alpha olefin copolymer is an inner layer.

7. The heat-shrinkable film according to claim 6, wherein the homogeneous ethylene/alpha olefin copolymer is present in the inner layer in an amount of from about 60 to 100 weight percent, based on the weight of the inner layer, and wherein the inner layer has a thickness of about 1 to 3 mils.

8. The heat-shrinkable film according to claim 7, wherein the homogeneous ethylene/alpha olefin copolymer is present in the inner layer in an amount of about 80 to 100 weight percent, based on the weight of the inner layer, and wherein the inner layer has a thickness of about 1 to 2.5 mils.

9. The heat-shrinkable film according to claim 8, wherein the homogeneous ethylene/alpha olefin copolymer is present in the inner layer in an amount of about 90 to 100 weight percent, based on the weight of the inner layer.

10. The heat-shrinkable film according to claim 7, wherein the homogeneous ethylene/alpha olefin copolymer is a first component present in a composition which further comprises a second component comprising least one member selected from the group consisting of another ethylene/alpha-olefin copolymer, ethylene/vinyl acetate copolymer, ethylene/vinyl ester copolymer, ethylene/acrylic acid copolymer, propylene/ethylene copolymer, polyethylene homopolymer, polypropylene homopolymer, and ionomer, wherein the second component is present in the composition in an amount of from about 1 to 40 weight percent, based on the weight of the composition.

11. The beat-shrinkable film according to claim 10, wherein the first component and the second component are in a uniform blend.

12. The heat-shrinkable film according to claim 11, wherein the homogeneous ethylene/alpha olefin copolymer is present in a composition which further comprises at least one member selected from the group consisting of a maleic anhydride grafted ethylene/alpha-olefin copolymer, maleic anhydride grafted ethylene/vinyl acetate copolymer, maleic anhydride grafted ethylene/vinyl ester copolymer, maleic anhydride grafted ethylene/acrylic acid copolymer, maleic anhydride grafted propylene/ethylene copolymer, maleic anhydride grafted polyethylene homopolymer, maleic anhydride grafted polypropylene homopolymer, and maleic anhydride grafted ionomer.

13. The heat-shrinkable film according to claim 6, wherein the multilayer heat-shrinkable film further comprises a barrier layer and an outer sealant layer.

14. The heat-shrinkable film according to claim 13, wherein the outer sealant layer is a first outer layer, and an outer abuse layer is a second outer layer.

15. The heat-shrinkable film according to claim 13, further comprising at least one tie layer between the barrier layer and the first outer layer.

16. The heat-shrinkable film according to claim 15, wherein the tie layer between the barrier layer and the first outer layer is a first tie layer, and a second tie layer is between the barrier layer and the second outer layer.

17. The heat-shrinkable film according to claim 1, wherein the film is a multilayer heat-shrinkable film, and the film layer comprising the homogeneous ethylene/alpha-olefin copolymer is a first outer film layer.

18. The heat-shrinkable film according to claim 17, wherein the homogeneous ethylene/alpha-olefin copolymer in the first outer film layer is a first homogeneous ethylene/alpha-olefin copolymer, and wherein the film further comprises a second outer film layer comprising a second homogeneous ethylene/alpha-olefin copolymer.

19. The heat-shrinkable film according to claim 18, wherein the first homogeneous ethylene/alpha-olefin copolymer is identical to the second homogeneous ethylene/alpha-olefin copolymer.

20. The heat-shrinkable film according to claim 18, the first and second outer layers are identical in chemical composition and thickness, and the heat-shrinkable film is symmetrical.

21. The heat-shrinkable film according to claim 19, wherein:

the heat-shrinkable film comprises a first inner layer, a second inner layer, and a third inner layer;

the first inner layer is a first tie layer, the second inner layer is an O$_2$-barrier layer, and the third inner layer is a second tie layer;

the first and second outer layers are identical in chemical composition and thickness;

the first and second tie layers are identical in chemical composition and thickness; and the heat-shrinkable film is symmetrical.

22. The heat-shrinkable film according to claim 1, wherein the ethylene/alpha-olefin copolymer is a copolymer of ethylene and an alpha-olefin comprising hexene or octene.

23. The heat-shrinkable film according to claim 1, wherein the homogeneous ethylene/alpha-olefin copolymer has a density of from 0.90 to 0.93 g/cm$^3$.

24. A heat-shrinkable film comprising homogeneous linear ethylene/C$_{6-10}$ alpha-olefin copolymer, the heat-shrinkable film having a thickness of from 1 to 3 mils, an impact strength of from about 80 to 250 pounds, and a total free shrink, at 185° F., of from about 30 to 150 percent.

25. The heat-shrinkable film according to claim 24, wherein the heat-shrinkable film has an impact strength of from about 80 to 200 pounds, and a total free shrink, at 185° F., of from about 50 to 120 percent.

26. The heat-shrinkable film according to claim 24, wherein the heat-shrinkable film is a monolayer film.

27. The heat-shrinkable film according to claim 24, wherein the heat-shrinkable film is a multilayer heat-shrinkable film, and the layer comprising the homogeneous ethylene/alpha olefin copolymer is an inner layer.

28. The heat-shrinkable film according to claim 24, wherein the ethylene/alpha-olefin copolymer is a copolymer of ethylene and an alpha-olefin comprising hexene or octene.

29. The heat-shrinkable film according to claim 24, wherein the homogeneous ethylene/alpha-olefin copolymer has a density of from 0.90 to 0.93 g/cm$^3$.

30. An article comprising a heat-shrinkable film comprising a film layer comprising homogeneous linear ethylene/C$_{6-10}$ alpha-olefin copolymer, wherein the heat-shrinkable film has an impact strength of from about 40 to 200 pounds and a total free shrink, at 185° F., of from about 80 to 150 percent, and wherein the article is a member selected from the group consisting of a bag and a casing.

31. The heat-shrinkable film according to claim 30, wherein the ethylene/alpha-olefin copolymer is a copolymer of ethylene and an alpha-olefin comprising hexene or octene.

32. The heat-shrinkable film according to claim 30, wherein the homogeneous ethylene/alpha-olefin copolymer has a density of from 0.90 to 0.93 g/cm$^3$.

33. A heat-shrinkable film comprising homogeneous linear ethylene/C$_{6-10}$ alpha-olefin copolymer, the heat-shrinkable film having an impact strength of from about 40 to 200 pounds and a total free shrink, at 185° F., of from about 80 to 150 percent, wherein the film is biaxially oriented.

34. The heat-shrinkable film according to claim 33, herein the ethylene/alpha-olefin copolymer is a copolymer of ethylene and an alpha-olefin comprising hexene or octene.

35. The heat-shrinkable film according to claim 33, wherein the homogeneous ethylene/alpha-olefin copolymer has a density of from 0.90 to 0.93 g/cm$^3$.

36. The heat-shrinkable film according to claim 33, wherein the film is a multilayer film with homogeneous ethylene/alpha-olefin copolymer present in a first layer, the film further comprising a second layer comprising an O$_2$-barrier layer.

37. The heat-shrinkable film according to claim 32, wherein the homogeneous ethylene/alpha-olefin copolymer is present in an outer film layer.

38. The heat-shrinkable film according to claim 36, wherein the homogeneous ethylene/alpha-olefin copolymer is present in an inner film layer.

39. The heat-shrinkable film according to claim 33, wherein the homogeneous ethylene/alpha-olefin copolymer is a metallocene-catalyzed ethylene/alpha-olefin copolymer.

40. The heat-shrinkable film according to claim 33, wherein the heat-shrinkable film has an impact strength of from about 40 to 90 pounds.

41. The heat-shrinkable film according to claim 40, wherein the heat-shrinkable film has a total thickness of from about 1 to 3 mils.

42. The heat-shrinkable film according to claim 41, wherein the heat-shrinkable film has a total free shrink at 185° F., of from about 80 to 120 percent.

43. The heat-shrinkable film according to claim 42, wherein the homogeneous ethylene/alpha-olefin copolymer is a first component present in a composition which further comprises a second component comprising at least one member selected from the group consisting of another ethylene/alpha-olefin copolymer, ethylene/vinyl acetate copolymer, ethylene/vinyl ester copolymer, ethylene/acrylic acid copolymer, propylene/ethylene copolymer, polyethylene homopolymer, polypropylene homopolymer, and ionomer, wherein the second component is present in the composition in an amount of from about 1 to 40 weight percent, based on the weight of the composition.

44. The heat-shrinkable film according to claim 42, wherein the homogeneous ethylene/alpha-olefin copolymer is present in a composition which further comprises at least one member selected from the group consisting of a maleic anhydride grafted ethylene/alpha-olefin copolymer, maleic anhydride grafted ethylene/vinyl acetate copolymer, maleic anhydride grafted ethylene/vinyl ester copolymer, maleic anhydride grafted ethylene/acrylic acid copolymer, maleic anhydride grafted propylene/ethylene copolymer, maleic anhydride grafted polyethylene homopolymer, maleic anhydride grafted polypropylene homopolymer, and maleic anhydride grafted ionomer.

45. The heat-shrinkable film according to claim 30, wherein the heat-shrinkable film is biaxially oriented.

46. The heat-shrinkable film according to claim 45, wherein the film is a multilayer film with the homogeneous ethylene/alpha-olefin copolymer present in a first layer, the film further comprising a second layer comprising an O$_2$-barrier layer.

47. The heat-shrinkable film according to claim 45, wherein the homogeneous ethylene/alpha-olefin copolymer is a metallocene-catalyzed ethylene/alpha-olefin copolymer.

48. A heat-shrinkable film comprising a homogeneous linear ethylene/C$_{6-10}$ alpha-olefin copolymer having a melt index of 1 g/10 min, shrink at 200° F. of at least 38% shrink in each direction and exhibiting a peak instrumented impact of at least 31 pounds.

49. A heat-shrinkable film comprising a homogeneous linear ethylene/alpha-olefin copolymer, the film having a free shrink at 200° F. of from 13% to 55% in the longitudinal direction and from 10% to 53% in the transverse direction, and a peak impact strength of from 31 to 86.8 pounds.

50. The heat-shrinkable film according to claim 49, wherein the alpha-olefin has from 6 to 10 carbon atoms.

51. The heat-shrinkable film according to claim 50, wherein the homogeneous linear ethylene/alpha-olefin copolymer has a density of from 0.898 to 0.922 g/cm$^3$.

* * * * *